(No Model.)
7 Sheets—Sheet 2.
F. B. GRIFFITH.
CRANE.
No. 524,780.
Patented Aug. 21, 1894.
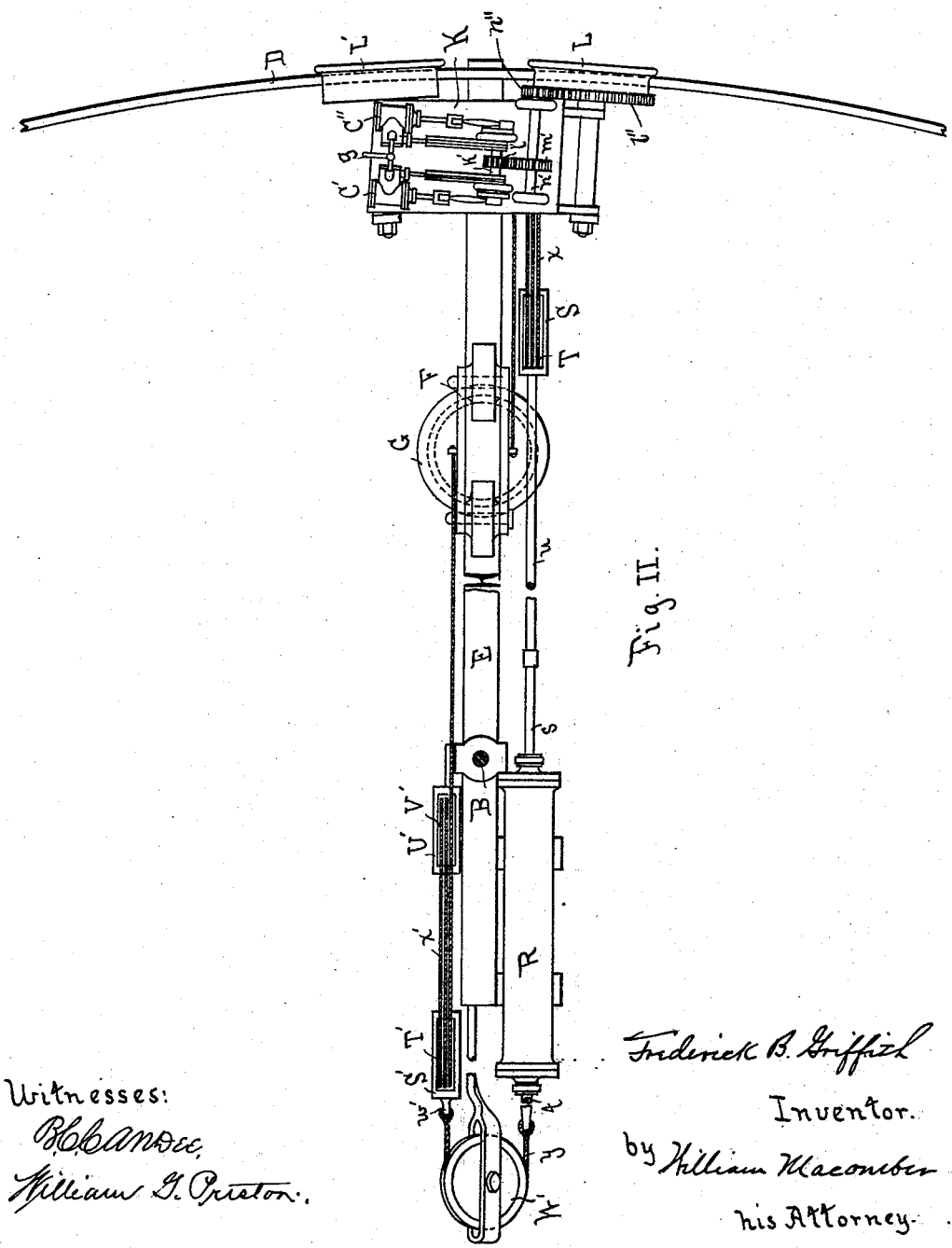
Witnesses:
B. H. Candee
William G. Preston
Frederick B. Griffith
Inventor.
by William Macomber
his Attorney

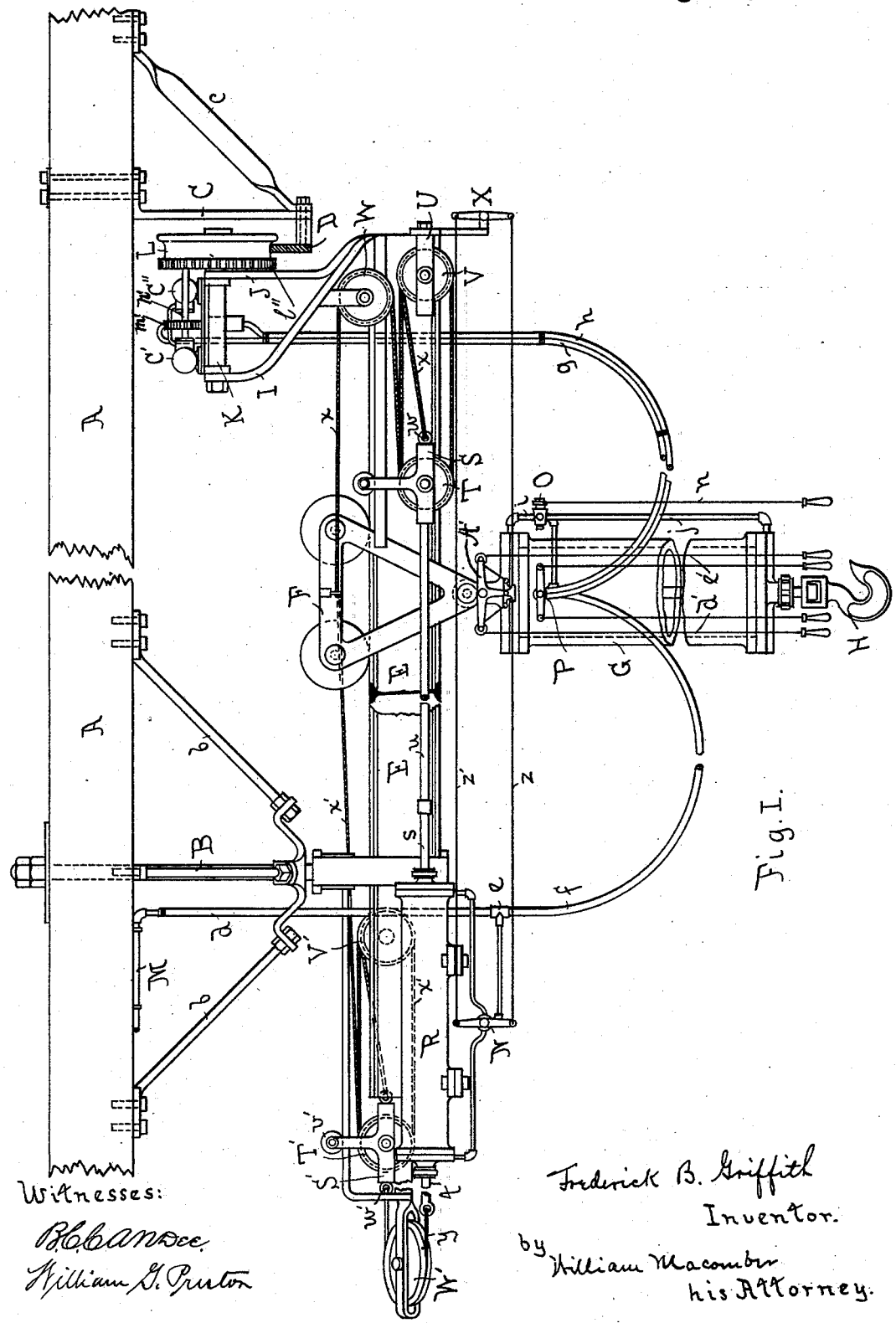

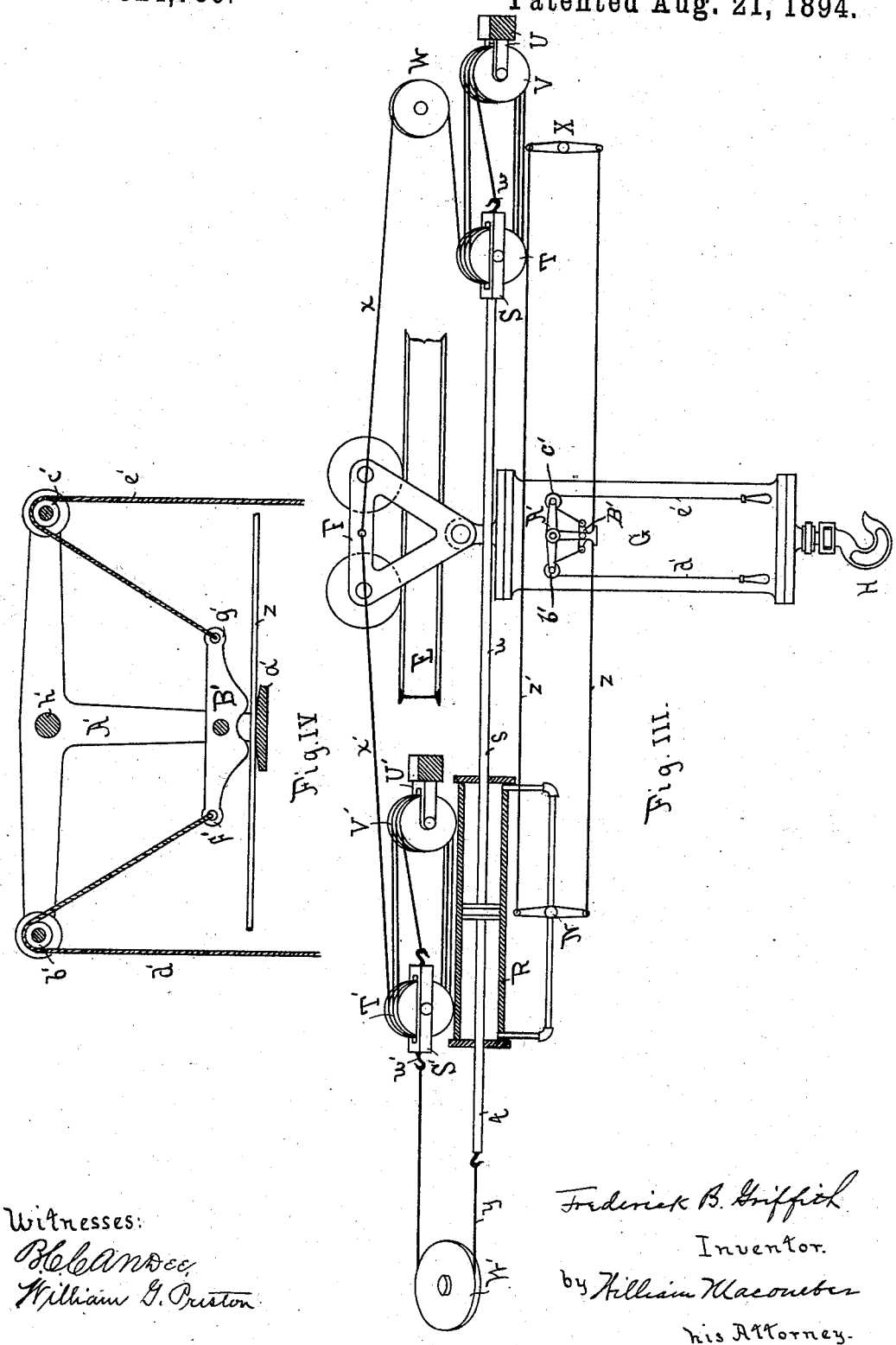

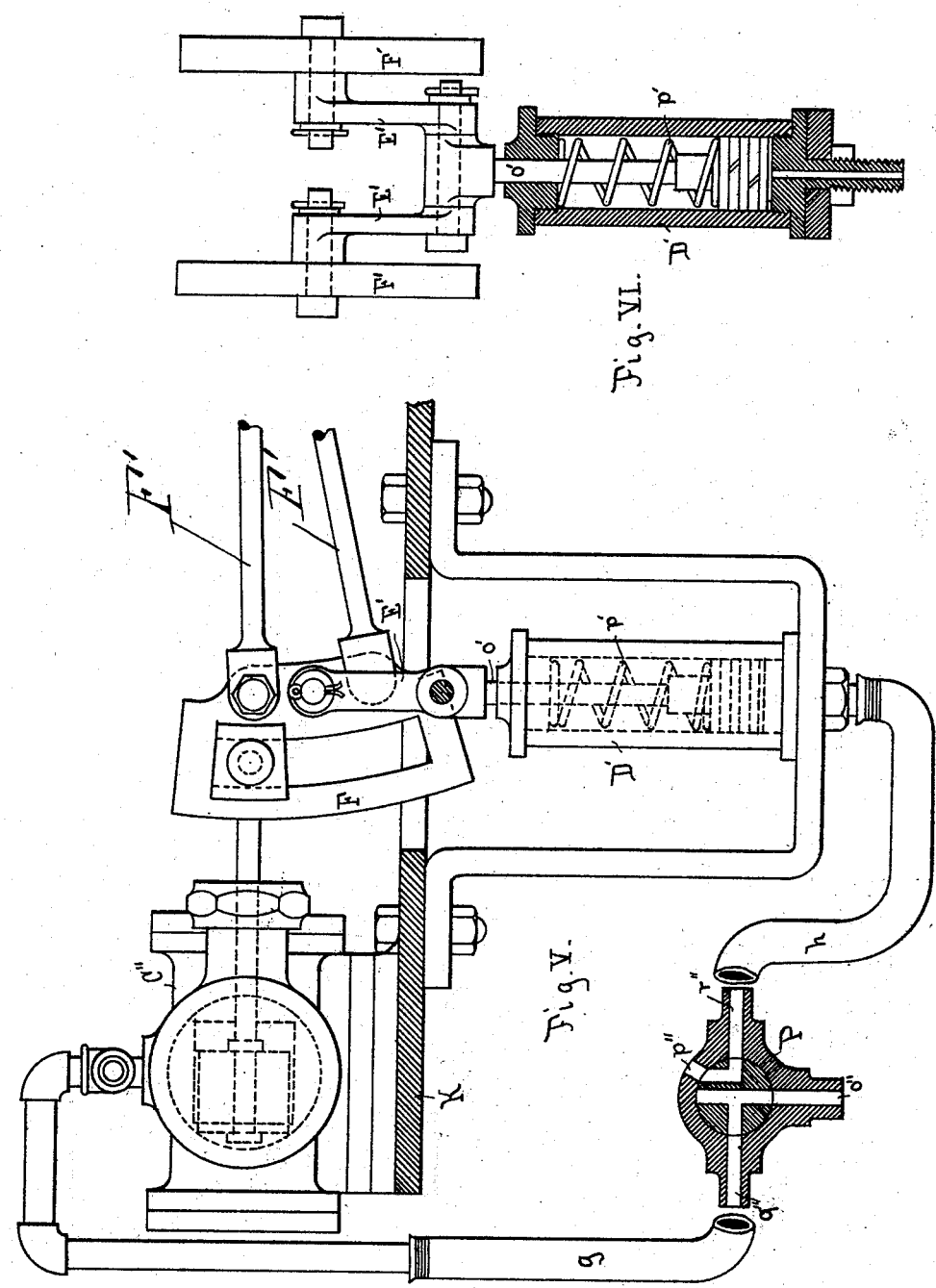

(No Model.)　　　　　F. B. GRIFFITH.　　　7 Sheets—Sheet 5.
CRANE.
No. 524,780.　　　　　　　Patented Aug. 21, 1894.
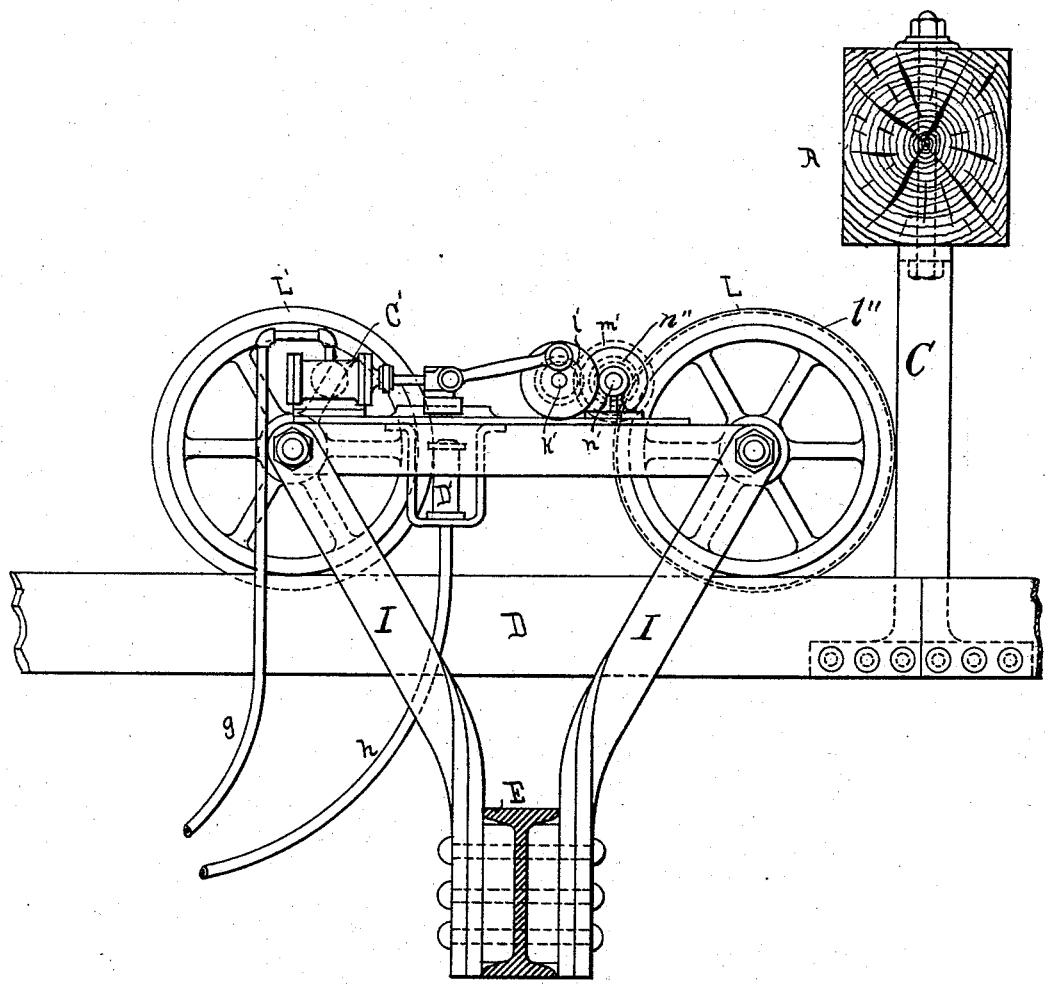
Fig. VII.

(No Model.) 7 Sheets—Sheet 6.
F. B. GRIFFITH.
CRANE.
No. 524,780. Patented Aug. 21, 1894.
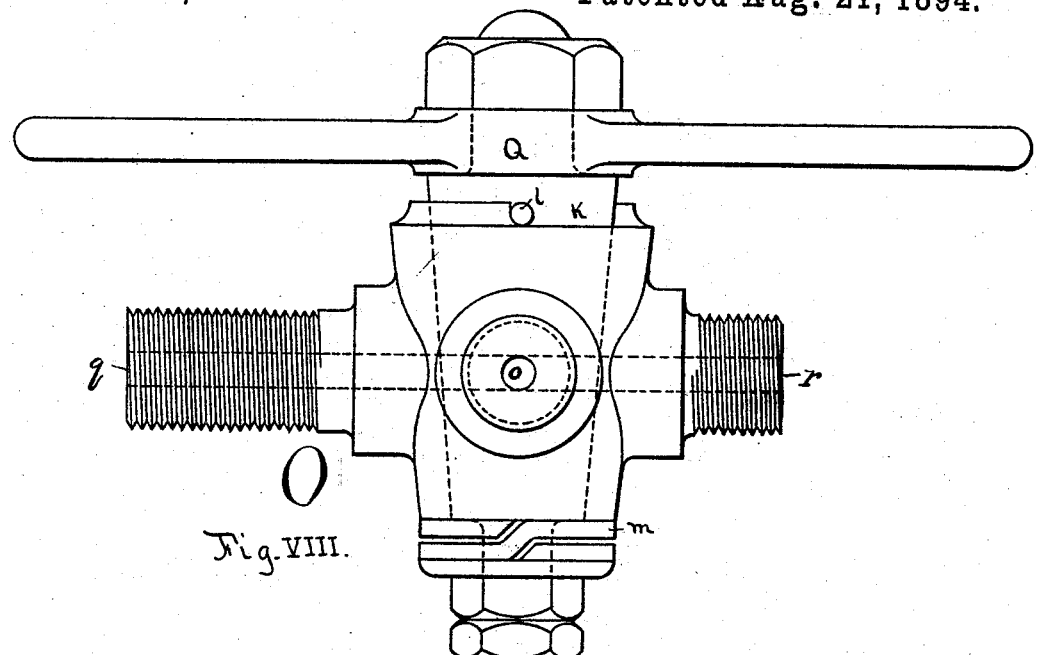
Fig. VIII.
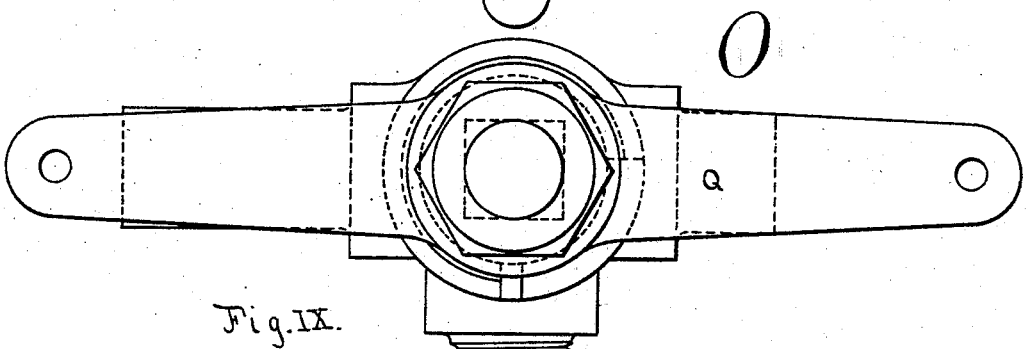
Fig. IX.
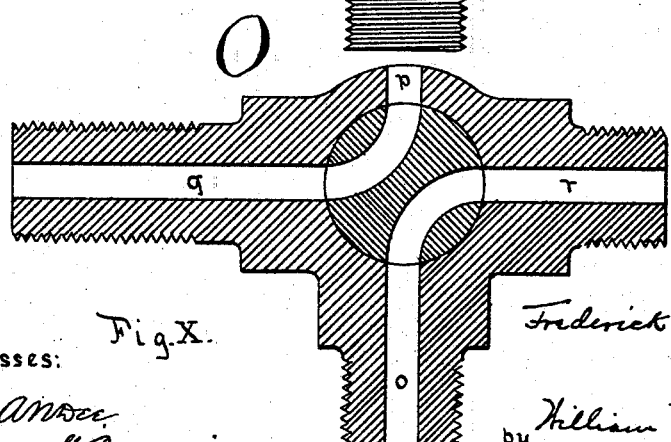
Fig. X.
Witnesses:
B. C. Anson
William G. Preston
Frederick B. Griffith
Inventor
by William Macomber
his Attorney.

(No Model.) 7 Sheets—Sheet 7.
F. B. GRIFFITH.
CRANE.
No. 524,780. Patented Aug. 21, 1894.
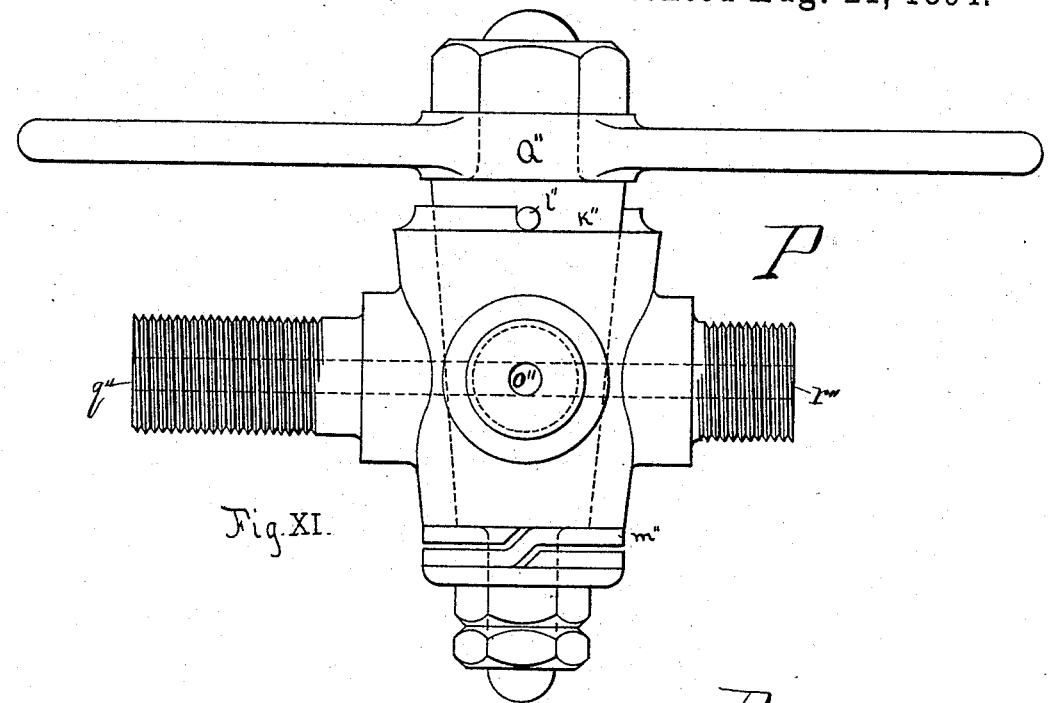
Fig. XI.
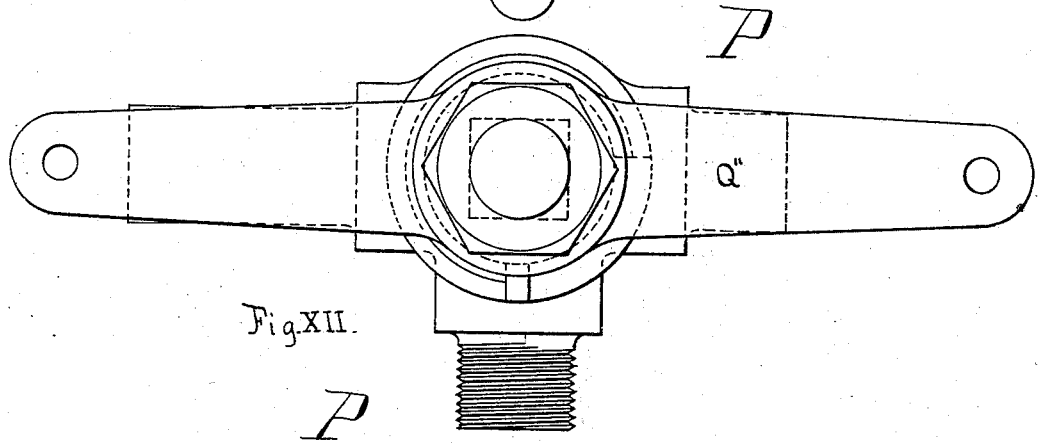
Fig. XII.
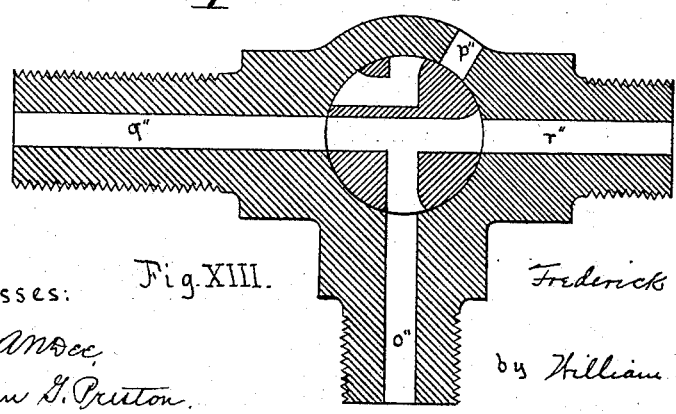
Fig. XIII.
Witnesses:
Frederick B. Griffith
Inventor.
by William Macomber
his Attorney.

UNITED STATES PATENT OFFICE.

FREDERICK B. GRIFFITH, OF BUFFALO, NEW YORK.

CRANE.

SPECIFICATION forming part of Letters Patent No. 524,780, dated August 21, 1894.

Application filed January 27, 1894. Serial No. 498,166. (No model.)

*To all whom it may concern:*

Be it known that I, FREDERICK B. GRIFFITH, a citizen of the United States, residing at Buffalo, in the county of Erie and State of New York, have invented certain new and useful Improvements in Cranes, of which the following is a specification.

My invention relates to a new and improved crane, and more particularly to that class of machines which are actuated by steam or air under pressure, and in which the arm or truss either swings about a pivotal point or travels upon parallel ways or tracks. It is especially important in this class of machines, which are calculated to move great weights over a given area, that they should possess great power, certainty and steadiness of action, as great rapidity as is consistent with the mass moved, as great range as possible over the area occupied, and also that the means of actuating the machinery should all be brought to a single point of control, and which point should be within easy reach from the point of attachment of the load, in order that the crane may be operated by a single workman. My invention accomplishes these ends; and reference is at once had to the drawings herewith, consisting of seven sheets, to show its construction and operation.

Figure I is an elevation of my machine. Fig. II is a top plan view of the same. Fig. III is a diagrammatic view showing the mechanism for producing the longitudinal movement of the trolley. Fig. IV is a detail elevation of my wire clutch mechanism. Figs. V and VI are detail views partly in elevation and partly in cross section showing my reversing mechanism. Fig. VII is a detail elevation of my engine and reversing mechanism. Figs. VIII, IX and X are views in plan, elevation and cross section, respectively of the cocks which are applied to the pipes leading to the cylinders producing the vertical and longitudinal movements. Figs. XI, XII and XIII are similar views of the cock which actuates the reversing mechanism and engines which produce the progressive movement.

Like letters refer to like parts throughout the drawings.

In the drawings I have shown, for purposes of clearness and not limitation, a machine which is mounted upon a pivot and circular track; but it is apparent to any skilled mechanic that application of the same to parallel tracks, in the form of an ordinary traveling crane, requires only well-known mechanical change.

A represents one of the girders or heavy joists by which the machine is supported.

B is a pivot or king-bolt, securely braced by braces, *b, b,* upon which the arm or truss swings, and C, represents one of the brackets, braced by braces, *c,* which support the circular track, D.

E is the arm or truss which is mounted rotatably upon the pivot, B, and which is supported at its outer end upon the circular track, through connecting parts hereinafter described. Mounted upon the truss, E, in the well-known form of construction shown, is the trolley, F, which travels longitudinally thereon, and which sustains the hoisting mechanism.

G is the hoisting cylinder which is secured at its upper end to the lower extremity of the trolley, F, and which has a single piston and rod, provided with a hook, H, to attach to the load. Mounted upon the brackets, I and J, rigidly secured to the outer end of the truss, E, is a carriage, K, which has two travelers or wheels, L, L', flanged like a car-wheel, one of which is driven by means of an engine, situated upon the carriage, K, which connects by spur-gears with the periphery of the wheel, as hereinafter more fully shown.

M is the stationary supply pipe, affording the air or steam pressure, which should be situated near the king-bolt, B. The continuation of the supply pipe, *d,* connecting with the rotatable parts, is a flexible hose or tube, which connects with the T joint, *e,* one branch of which connects with the cock, N, which supplies the cylinder R affording the longitudinal movement, and the other branch connects with the flexible hose or tube, *f,* which connects with the cock, O, which supplies the cylinder G affording the vertical movement, and which also connects with the cock, P, which, by means of the flexible tubes or hose, *g* and *h,* supplies the cylinders and reversing mechanism of the engine affording the movement in rotation.

The hoisting cylinder consists simply of a cylinder having a vertical axis, carrying a properly packed piston and rod, to the end of which may be attached a hook, H, or other grappling device. Leading into the ends of the cylinder are the pipes, $i$ and $j$, which are coupled to the cock, O.

By reference now to Figs. VIII, IX and X, the construction is more clearly seen. I prefer the common construction shown of a taper shank, $k$, held tight by a compression washer, $m$, held up by a nut and check-nut. The rotation of the taper is limited to a quarter turn by a pin, $l$, which strikes against a three-quarter rim about the neck of the cock. The head of the taper is provided with a double lever, Q, at the extremities of which are holes for securing cords or light chains, as shown at $n$, Fig. I, which extend down within reach of the operator. By pulling one or the other of these cords or chains the cock is operated. By reference to Fig. X the construction of the ports is seen, where $o$ is the inlet, $p$ is the exhaust, $q$ the tube leading to one end and $r$ to the opposite end of the cylinder. When the lever arm is horizontal the ports are closed. When rotated an eighth turn one port connects the inlet with the tube leading to one end of the cylinder, while the tube leading to the other end is connected with the exhaust. When rotated an eighth turn from its horizontal position in the opposite direction the connections are reversed. In this manner the pressure may be readily applied either to raise or lower the piston.

Referring now to the mechanism for producing the longitudinal movement, R is a horizontal cylinder with its ends connected with tubes which lead from the cock, N, which is the same in construction as the cock O, just described, although operated in a manner hereinafter described. The piston rod of the cylinder extends through both ends, as shown at $s$ and $t$. The end $s$ is connected to a connecting-rod, $u$, which connects with the pulley-block, S, which travels upon a track attached to the truss, E. This pulley-block contains as many pulleys, T, as the compounding requires. A corresponding pulley-block, U, with pulleys, V, is rigidly secured to the outer end of the truss, E. A cable, $x$, is secured to an eye, $w$, in the pulley-block, S, which then passes over the two sets of pulleys as shown, leaving one of the pulleys, T, and passing over an idler, W, which is secured to the bracket I, and thence extends and is secured to the frame of the trolley, F. The opposite end of the piston rod, $t$, has an eye which engages a short cable, $y$, which passes over an idler, W', secured to the inner end of the truss, E, and engages with an eye, $w'$, in a pulley-block, S', which travels upon a short track secured to the truss, E. This pulley-block and its stationary mate, U', carry pulleys, T' and V', in numbers and size corresponding to those of the opposite end. A cable, $x'$, starts from an eye in the block S', and after making a number of turns corresponding to the opposite set, passes directly from one of the pulleys, T' to the frame of the trolley, F. Thus it will be seen, that by a limited action of the piston I secure a co-ordinated action of the two sets of pulleys and a range of action for the trolley over the entire length of the truss.

Referring now to the method of operating the cock, N, at the two extremities of the double lever I attach wires $z$ and $z'$, which extend horizontally and parallel the length of the truss, E, and are engaged to a corresponding double lever, X, which is pivoted to a bracket upon the outer end of the truss. Pivoted to the lower end of the frame of the trolley, F, is a T shaped clutch, A', which is clearly shown in Fig. IV. The lower extremity of the clutch has an outwardly projecting base, $a'$, which engages underneath the wire $z$. The upper arms carry at their extremities small pulleys, $b'$ and $c'$, over which the cords $d'$ and $e'$ pass. Near the end of the lower arm of the clutch is pivoted a dog B', which is provided with two arms, $f'$ and $g'$, to which the ends of the cords $d'$ and $e'$ are attached. In operation, when one of the cords is pulled by the operator it pinches down the dog, B', upon the wire, $z$, which rests upon the base, $a'$. Pulling the cord farther, the entire T shaped clutch is rocked upon its pivot, $h'$, and consequently the wire $z$ is moved in the direction of its length, and by reason of its connection with the double levers and the wire $z'$, the cock, N, is operated. Then the trolley begins to move, carrying with it the clutch, A', and by construction of the connections, in the direction which tends to release the clutch from the wire. If the other cord be then pulled the dog will engage the wire and the progress of the trolley will be stopped by the tendency of the clutch to shut off the cock; and if the cord is pulled farther still, the pressure in the cylinder will be reversed and the trolley will move in the opposite direction.

Referring now to my mechanism for rotating the crane upon its axis, C' and C'' are the cylinders of a double engine, mounted upon the carriage, K. Steam or compressed air is supplied to them in common from the flexible hose, $g$. By the usual mechanism these cylinders with their connecting mechanism drive a shaft $k'$, which carries the eccentrics for the engine and also a spur-gear, $l'$, which meshes with the spur-gear $m'$ upon a second shaft, $n'$. Upon the outer end of the shaft $n'$ is a small spur-gear $n''$ which engages with a peripheral gear $l''$ upon the inner face of the wheel L, thus communicating the action of the engine to the wheel L, which acts as a driver.

Situated beneath the reversing links, F', is a vertical cylinder, D', with an upwardly projecting piston rod, $o'$, to the end of which is attached a yoke, E', to which the reversing links, F', are pivoted. Within the cylinder is a compression-spring, $p'$, which tends to force the piston to the base of the cylinder.

Referring now to the cock, shown in Figs. XI, XII and XIII, and also in Fig. V. The general construction is the same as shown in the other cock, employing a similar double lever, Q'', taper, k'', stop, l'', and compression washer, m''. o'' is the inlet, q'' is the tube connecting with the hose g leading to the engine, r'' leads to the hose h, running to the reversing cylinder, and p'' is the exhaust to the reversing cylinder. In operation, when the lever arms are horizontal, the ports are all closed. When the cock is turned in the direction to operate the engine in the direction taken when the link is in the position shown in Fig. V, the ports will occupy the position shown in that figure. When it is desired to reverse the engine, the position of ports will be that shown in Fig. XIII. The orifices of the ports which connect the inlet with the reversing cylinder are extended slightly upon one side so as to permit of ingress of air or steam to the reversing cylinder an instant before the steam or air reaches the cylinders of engines, to insure reversal before action begins; and in like manner the orifices of the port connecting the reversing cylinder with the exhaust are also extended to insure release of pressure and reversal by means of the compression spring before action begins. With this construction I dispense with all chains, and with all gearing wherever the jar or irregular motion occasioned thereby has been objectionable. This is a very important matter, because, with my machine I am able to move and place a load with no jarring whatever. Again, by performing all of the motions by steam or compressed air, and having the same perfectly under control, I am able to control the range and rapidity of movement with such ease that the slightest shifting of a heavy load is made with exactness. Again, by bringing the controlling mechanism to a single point near to the hook or grapple, the machine is readily operated by a single workman, thus making the machine substantially a tool in the hands of the mechanic, enabling him to handle his material with independence, ease and exactness.

Having thus described my invention, I claim—

1. In a crane, the combination of the trolley for supporting the load, the means for moving the trolley, and the controlling devices for such means having the ends by which they are manipulated brought adjacent to the place of attachment of the load, substantially as set forth.

2. In a crane, the combination of the trolley, means carried thereby for attaching the load, devices for controlling the last said means, and means for operating the controlling devices having their ends by which they are manipulated supported by the said trolley and brought relatively close together and adjacent to the point of attaching the load, substantially as set forth.

3. The combination with the trolley supporting the load, of a cylinder, a piston, a piston rod extending through both heads of said cylinder, two sets of compounding pulleys and a cable for each set of pulleys, said cables being secured at opposite ends of the piston rod, passing around said pulleys, and secured at their other ends to the trolley, substantially as described.

4. In a pneumatic crane, the combination of an arm or truss, a trolley carried thereby, with a cylinder, R, having a double piston rod, s and t, movable pulley-blocks, S and S', stationary pulley-blocks, U and U', cables, x and x', and idlers, W and W', substantially as shown.

5. The combination of the arm or truss, the trolley which supports the load, a cylinder, a piston, a piston-rod extending through both ends of the cylinder, the cables connecting the opposite ends of the said rod with the trolley, the pulleys upon the truss or arm, near its opposite ends, around which the cables pass, the means whereby motor fluid is admitted to the cylinder, a valve controlling the same, and controlling means for the valve extending to a point adjacent to the place of attachment of the load, substantially as set forth.

6. In a crane, the combination with the truss, of the trolley adapted to travel on said truss, means for moving the trolley on said truss, and means for controlling said moving means consisting of a cock, a lever carried by said cock, wires attached to the extremities of said lever and running parallel with and substantially the length of said truss, a second lever pivoted to the truss, and having its ends secured to the ends of the wires, and a clutch mechanism consisting of a T shaped body pivoted to the trolley and having a projection, a dog pivoted to the T shaped body, one of the wires passing between the dog and the projection, and cords or chains attached to ends of the dog and passing over pulleys upon the T shaped body, by means of which the wire may be clamped by the dog and then given a longitudinal movement by the swinging of the T shaped body on its pivot, substantially as described.

7. In a crane, the combination of the arm or truss, the trolley movable thereon, means for moving the trolley, a valve controlling the said means, a shifting device for the valve carried by the arm or truss along the path of travel of the trolley, a movable clutch device carried by the trolley arranged to be made to engage with and to actuate the said shifting device, and means for actuating the said clutch, substantially as set forth.

8. In a crane, the combination of a cock, a lever carried by said cock, wires attached to the extremities of said lever, a second lever, having its ends secured to the ends of the wires, and a clutch mechanism consisting of a pivoted T shaped body having a projection, a dog pivoted to the T shaped body, one of the wires passing between the dog and the projection, and cords or chains attached to the dog by means of which the wire may be clamped by the dog and then given a longitudinal movement by the swinging of the T shaped body, substantially as described.

9. In a crane, a track, a carriage adapted to travel on said track, a truss mounted on said carriage, an engine and connections between said engine and one of the wheels of said carriage for driving said carriage, and reversing gear for said engine, substantially as described.

10. In a crane, the combination with an engine, a reversing mechanism therefor, and a cylinder and piston for shifting said reversing mechanism, of a cock and means whereby said cock is adapted to admit fluid both to the engine and to the above named cylinder, substantially as described.

11. In a crane, the combination of a cock, P, with the hose, $g$, and $h$, cylinders, C′ and C″, cylinder D′, compression spring $p'$, yoke, E′, and reversing links, F′, substantially as shown.

12. In a crane, the combination, with an engine, a reversing mechanism therefor, and a cylinder and piston for shifting said reversing mechanism, of a cock provided with extended orifices and means whereby said cock is adapted to admit fluid both to the engine and to the above-named cylinder, substantially as described.

In testimony that I claim the above invention I affix my signature in the presence of two witnesses.

FREDERICK B. GRIFFITH.

Witnesses:
J. C. ALMENDINGER,
VINCENT P. RIORDAN.